(12) United States Patent
Song

(10) Patent No.: US 11,964,657 B2
(45) Date of Patent: Apr. 23, 2024

(54) APPARATUS AND METHOD FOR CONTROLLING TRAVEL ON SLOPE

(71) Applicants: Hyundai Motor Company, Seoul (KR); Kia Corporation, Seoul (KR)

(72) Inventor: Si Young Song, Hwaseong-Si (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 0 days.

(21) Appl. No.: 18/077,444

(22) Filed: Dec. 8, 2022

(65) Prior Publication Data
US 2024/0059289 A1 Feb. 22, 2024

(30) Foreign Application Priority Data
Aug. 17, 2022 (KR) .......................... 10-2022-0102698

(51) Int. Cl.
*B60W 30/18* (2012.01)
(52) U.S. Cl.
CPC . *B60W 30/18009* (2013.01); *B60W 2520/105* (2013.01); *B60W 2520/28* (2013.01); *B60W 2552/15* (2020.02)
(58) Field of Classification Search
CPC ....... B60W 30/18009; B60W 2552/15; B60W 2520/105; B60W 2520/28
USPC .......................................................... 701/84
See application file for complete search history.

(56) References Cited

U.S. PATENT DOCUMENTS

| 10,703,376 B2 | 7/2020 | Coerman et al. |
| 2007/0270281 A1 | 11/2007 | Inoue et al. |

FOREIGN PATENT DOCUMENTS

| CN | 113267347 A | * | 8/2021 | |
| GB | 2523177 A | * | 8/2015 | ...... B60W 30/18027 |
| JP | 2007-309486 A | | 11/2007 | |

* cited by examiner

*Primary Examiner* — Lindsay M Low
*Assistant Examiner* — Omar Morales
(74) *Attorney, Agent, or Firm* — MORGAN, LEWIS & BOCKIUS LLP

(57) ABSTRACT

An apparatus of controlling travel on a slope includes a receiver configured for obtaining information on a vehicle, a slope travel determiner configured to determine whether the vehicle is traveling on a slope requiring a slope travel control, a slope travel preparator configured to set a virtual accelerator position sensor (APS) mode, and determine hill hold torque based on the obtained information on the vehicle, a slope travel controller operatively connected to the slope travel determiner, the slope travel determiner and the slope travel preparator and configured to determine driving torque of the vehicle, and control the vehicle to stop or travel on the slope by generating driving torque in an amount equal to or greater than the hill hold torque, and a torque generator operatively connected to the slope travel controller and configured to generate the driving torque determined by the slope travel controller.

20 Claims, 4 Drawing Sheets

APPARATUS AND METHOD FOR CONTROLLING TRAVEL ON SLOPE

CROSS-REFERENCE TO RELATED APPLICATION(S)

The present application claims priority to Korean Patent Application No. 10-2022-0102698 filed on Aug. 17, 2022, the entire contents of which is incorporated herein for all purposes by this reference.

BACKGROUND OF THE PRESENT DISCLOSURE

Field of the Present Disclosure

The present disclosure relates to an apparatus and method for controlling travel on a slope.

Description of Related Art

When a vehicle is started on a slope, the vehicle may move backwards for a period of time while a driver's foot is moved from a brake pedal to an accelerator pedal. Furthermore, a gradient load is acting on the slope. Thus, when the vehicle is started on a slope, driving torque stronger than that on a flat ground is required. Accordingly, when the driver adjusts the accelerator pedal on the slope in a similar manner to adjustment of the accelerator pedal on the flat ground, driving torque less than or equal to the gradient load may be generated, and the vehicle may not be started, but may move backwards.

Here, the gradient load refers to a load acting on the vehicle positioned on a slope due to gravity and frictional force, and may be a resultant force of a weight of the vehicle in proportion to an angle of the slope and frictional force acting on the vehicle. Furthermore, according to the related art, the driving torque may be generated in proportion to a degree to which the driver presses the accelerator pedal, and an accelerator position sensor (APS) may detect a degree of movement of the accelerator pedal to adjust driving force of the vehicle.

Furthermore, the vehicle may be started through frictional force between a tire and a road surface. When a user adjusts the accelerator pedal excessively, as compared to a climbable level, the frictional force between the tire and the road surface may be lost and wheel slip may occur. The vehicle may not be easily started due to wheel slip more easily occurring when a road surface friction coefficient is low, such as when snow is piled up on the slope or when the road is iced over.

Furthermore, in the case in which the vehicle is traveling on a slope, a weight of the vehicle may be further acting to rear wheels when the vehicle climbs the slope, and the weight of the vehicle may be inevitably further acting on front wheels. Accordingly, in the case of an all-wheel drive (AWD) vehicle, even when driving torque is generated at a ratio of 50:50 in the front wheels and the rear wheels of the vehicle, a difference in driving force for starting may be generated due to a difference in frictional force of a tire. Even when a traction control system (TCS) is used, brake control of all the four wheels may be possible through braking control. However, when slip occurs on all four wheels, TCS control may not be performed properly due to a small difference in the wheels.

As long as the driver continues to have the will to start or drive the vehicle on the slope, tire slip may occur continuously, the low-friction road surface with weak road surface strength may be easily dug into, and accordingly a rut may be formed. Only when the tire goes over the bump caused by the rut, the driver may start the vehicle. The vehicle may be stuck to be immovable.

The information included in this Background of the present disclosure is only for enhancement of understanding of the general background of the present disclosure and may not be taken as an acknowledgement or any form of suggestion that this information forms the prior art already known to a person skilled in the art.

BRIEF SUMMARY

Various aspects of the present disclosure are directed to providing a slope travel control apparatus and method for controlling driving torque on a slope without braking control so that a vehicle stops and travels.

According to an aspect of the present disclosure, there is provided an apparatus of controlling travel on a slope, the apparatus including a receiver configured for obtaining information on a vehicle, a slope travel determiner configured to determine whether the vehicle is traveling on a slope requiring a slope travel control, a slope travel preparator configured to set a virtual accelerator position sensor (APS) mode, and determine hill hold torque based on the information on the vehicle, a slope travel controller operatively connected to the slope travel determiner, the slope travel determiner and the slope travel preparator and configured to determine driving torque of the vehicle, and control the vehicle to stop or travel on the slope by generating driving torque in an amount equal to or greater than the hill hold torque, and a torque generator operatively connected to the slope travel controller and configured to generate the driving torque determined by the slope travel controller.

The virtual APS mode may be a mode in which the driving torque is controlled by the slope travel controller regardless of a degree of adjustment of an accelerator pedal in the vehicle by a user.

The hill hold torque is a torque stopping the vehicle on the slope by allowing the torque generator to generate the driving torque without operating a brake of the vehicle on the slope.

The slope travel determiner is configured to determine, based on whether the vehicle enters the slope and a degree of wheel slip occurring in the vehicle, whether the vehicle is traveling on the slope requiring the slope travel control.

The receiver is configured to receive at least one of wheel speed data, longitudinal acceleration data, gradient data, and output data of a motor or an engine of the vehicle.

The slope travel controller is configured to reset the hill hold torque and adjust a rising inclination of the driving torque, when a wheel slip including a preset value or more than the preset value occurs in the vehicle while travelling on the slope.

According to another aspect of the present disclosure, there is provided a method for controlling travel on a slope, the method including an operation of setting a virtual accelerator position sensor (APS) mode, and preparing, based on information on a vehicle, a slope travel control for determining hill hold torque, and an operation of controlling a driving torque of the vehicle so that the vehicle stops or travels on the slope by generating the driving torque in an amount equal to or greater than the hill hold torque.

An operation of determining a condition for starting the slope travel control may include an operation of determining, based on whether the vehicle enters the slope and a degree of wheel slip occurring in the vehicle, whether to perform an operation of preparing the slope travel control.

The operation of determining the condition for starting the slope travel control may include an operation of performing determination using at least one of wheel speed data, longitudinal acceleration data, gradient data, and output data of a motor or an engine of the vehicle.

The virtual APS mode may be a mode in which the driving torque is controlled by a slope travel controller regardless of a degree of adjustment of an accelerator pedal in the vehicle by a user.

The hill hold torque may be torque stopping the vehicle on the slope by allowing the torque generator to generate the driving torque without operating a brake of the vehicle on the slope.

According another aspect of the present disclosure, there is provided a slope travel control method for controlling a driving torque of the vehicle so that a vehicle stops or travels on a slope in a virtual accelerator position sensor (APS) mode in which the driving torque is controlled by a slope travel controller regardless of a degree of adjustment of an accelerator pedal by a user, the slope travel control method including an operation (a) of increasing the driving torque from a first hill hold torque to a first target torque at a first inclination, an operation (b) of resetting the first hill hold torque, the first inclination, and the first target torque to a second hill hold torque, a second inclination and a second target torque, respectively, when a wheel slip including a preset value or more than the preset value occurs in the vehicle, an operation (c) of increasing the driving torque from the second hill hold torque to the second target torque at the second inclination, and an operation of repeatedly performing the operation (b) and the operation (c). The hill hold torque may be torque stopping the vehicle on the slope by allowing the torque generator to generate the driving torque without operating a brake of the vehicle on the slope.

The second inclination may be equal to or less than the first inclination.

An operation of preparing the slope travel control in a four-wheel-drive vehicle may include an operation of setting hill hold torques and driving torques of front wheels and rear wheels of the vehicle differently in accordance with a direction of travel on the slope.

The virtual APS mode may be a mode in which the driving torque is controlled by the slope travel controller regardless of the degree of adjustment of the accelerator pedal by the user.

According to example embodiments of the present disclosure, an apparatus and method for controlling travel on a slope may prevent a vehicle from moving in a process of a driver's foot being moved from a brake pedal to an accelerator pedal when the vehicle is started after being stopped on a slope.

Furthermore, the vehicle may be stopped or started by generating driving torque equal to or greater than hill hold torque using the hill hold torque without braking force, more effectively controlling a starting torque, as compared to a case of using an apparatus of preventing a vehicle from moving (electric parking brake (EPB), automatic vehicle hill hold (AVH), or the like), the apparatus being startable when driving torque greater than a predetermined braking force is generated, according to the related art.

Furthermore, the driving torque being startable from the hill hold torque may be generated, gradually increasing the driving torque as compared to a case of increasing driving torque from 0 according to the related art, and minimizing the occurrence of wheel slip caused by a fluctuation in the driving torque.

Furthermore, the vehicle may travel autonomously on a slope by confirming only a driving intention of a user, stably travelling on a slope with predetermined friction regardless of a skill level of a driver.

The methods and apparatuses of the present disclosure have other features and advantages which will be apparent from or are set forth in more detail in the accompanying drawings, which are incorporated herein, and the following Detailed Description, which together serve to explain certain principles of the present disclosure.

Figure 1:
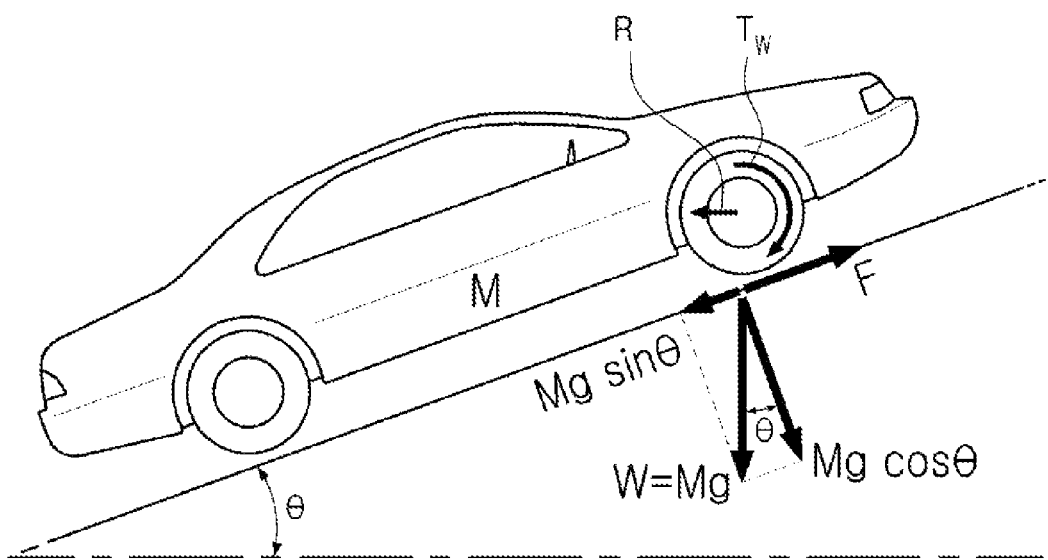
FIG. 1 is an exemplary schematic diagram illustrating force acting a vehicle on a slope.

It may be understood that the appended drawings are not necessarily to scale, presenting a somewhat simplified representation of various features illustrative of the basic principles of the present disclosure. The specific design features of the present disclosure as disclosed herein, including, for example, specific dimensions, orientations, locations, and shapes will be determined in part by the particularly intended application and use environment.

In the figures, reference numbers refer to the same or equivalent parts of the present disclosure throughout the several figures of the drawing.

DETAILED DESCRIPTION

Reference will now be made in detail to various embodiments of the present disclosure(s), examples of which are illustrated in the accompanying drawings and described below. While the present disclosure(s) will be described in conjunction with exemplary embodiments of the present disclosure, it will be understood that the present description is not intended to limit the present disclosure(s) to those exemplary embodiments of the present disclosure. On the other hand, the present disclosure(s) is/are intended to cover not only the exemplary embodiments of the present disclosure, but also various alternatives, modifications, equivalents and other embodiments, which may be included within the spirit and scope of the present disclosure as defined by the appended claims.

Various modifications may be made to the example embodiments. Here, the example embodiments are not construed as limited to the present disclosure and may be understood to include all changes, equivalents, and replacements within the idea and the technical scope of the present disclosure.

Terms such as first, second, A, B, (a), (b), and the like may be used herein to describe components. Each of these terminologies is not used to define an essence, order or sequence of a corresponding component but used merely to distinguish the corresponding component from other component(s). For example, a first component may be referred to a second component, and similarly the second component may also be referred to as the first component. The term "and/or" may include combinations of a plurality of related described items or any of a plurality of related described items.

The terminology used herein is for describing particular example embodiments only and is not to be limiting of the example embodiments. As used herein, the singular forms "a," "an," and "the" are intended to include the plural forms as well, unless the context clearly indicates otherwise. As used herein, the term "and/or" includes any one and any combination of any two or more of the associated listed items. It will be further understood that the terms "comprises" and/or "comprising," when used in the present specification, specify the presence of stated features, integers, steps, operations, elements, components or a combination thereof, but do not preclude the presence or addition of one or more other features, integers, steps, operations, elements, components, and/or groups thereof.

Unless otherwise defined herein, all terms used herein including technical or scientific terms have the same meanings as those generally understood by one of ordinary skill in the art. Terms defined in dictionaries generally used should be construed to have meanings matching contextual meanings in the related art and are not to be construed as an ideal or excessively formal meaning unless otherwise defined herein.

Hereinafter, exemplary example embodiments of the present disclosure will be described in more detail with reference to the accompanying drawings.

FIG. 1 is an exemplary schematic diagram illustrating force acting a vehicle on a slope.

FIG. 1 exemplarily illustrates force acting on a vehicle climbing a slope.

Referring to FIG. 1, on a slope including a gradient ($\theta$) a force of $Mg\sin\theta$ may be generated toward a lower portion of the slope by a weight (M) and a gravity (g) of the vehicle. Furthermore, the vehicle travels by frictional force between a tire and a road surface, and the frictional force may be determined by a product of a friction coefficient ($\mu$) between the tire and the road surface and a normal force, a force acting perpendicularly on a slope surface, and may be $\mu Mg\cos\theta$. Here, a resultant force of a force caused by gravity and a frictional force acting on a vehicle positioned on a slope may be referred to as a gradient load. When the vehicle descends the slope, the force of $Mg\sin\theta$ caused by a weight of the vehicle may acting in a direction of travel of the vehicle, a direction opposite to the frictional force ($\mu Mg\cos\theta$) of the vehicle. In the instant case, the force acting on the vehicle on the slope may be a value obtained by subtracting the force ($Mg\sin\theta$) caused by the weight of the vehicle from the frictional force ($\mu Mg\cos\theta$) of the vehicle. Hereinafter, a description will be provided based on a direction in which the vehicle climbs the slope.

For the vehicle to climb the slope, a force greater than a sum of $Mg\sin\theta$, a force caused by the weight of the vehicle, and $\mu Mg\cos\theta$ may need to be acting. A driving force (F) of the vehicle may be determined by a product of driving torque (Tw) generated by a motor or an engine of the vehicle and a dynamic radius (R) of the tire. Here, in case that the vehicle climbs the slope, when a force ($Mg\sin\theta + \mu Mg\cos\theta$) generated by the weight of the vehicle is equal to a force (Tw·R) caused by driving torque of the vehicle, the vehicle may be in a stationary state on the slope. Driving torque in a state in which the vehicle is stoppable on the slope may be referred to as hill hold torque (Th).

Furthermore, for the vehicle to start on the slope, an additional driving torque may be required for reasons such as inertia and a maximum static friction coefficient. Driving torque including a magnitude at which the vehicle is startable on the slope may be referred to as a target torque (Tt).

When the driving torque is greater than the target torque, the vehicle may climb the slope. When the driving torque is less than the hill hold torque, the vehicle may be pushed backwards. For example, in general, when stopping the vehicle on the slope, a user may press a brake pedal to stop the vehicle using a braking system. When driving the vehicle again, the user may press accelerator pedal to drive the vehicle. When there is no a system for preventing a vehicle from moving on a slope (electric parking brake (EPB), automatic vehicle hill hold (AVH), or the like), the vehicle may be pushed backwards in a process of the user putting his or her foot from the brake pedal to the accelerator pedal and a process before the driving torque greater than the hill hold torque occurs in the brake pedal, the vehicle may be pushed backwards. Furthermore, according to a technology for preventing a vehicle from moving on a slope according to the related art, the vehicle may be started by generating the driving torque equal to or greater than the target torque in a state in which the vehicle is braked on the slope. In the instant case, the driving torque may need to generate torque greater than or equal to the target torque from 0. A rapid increase in torque may cause wheel slip of the vehicle, and a gradual increase in torque may cause a start delay phenomenon due to lack of initial driving torque.

Conversely, according to a slope travel control apparatus 10 according to an exemplary embodiment of the present disclosure, the driving torque may be increased from the hill hold torque so that the target torque may be generated more rapidly than that Generally, and wheel slip caused by a rapid torque change may be minimized.

Figure 2:
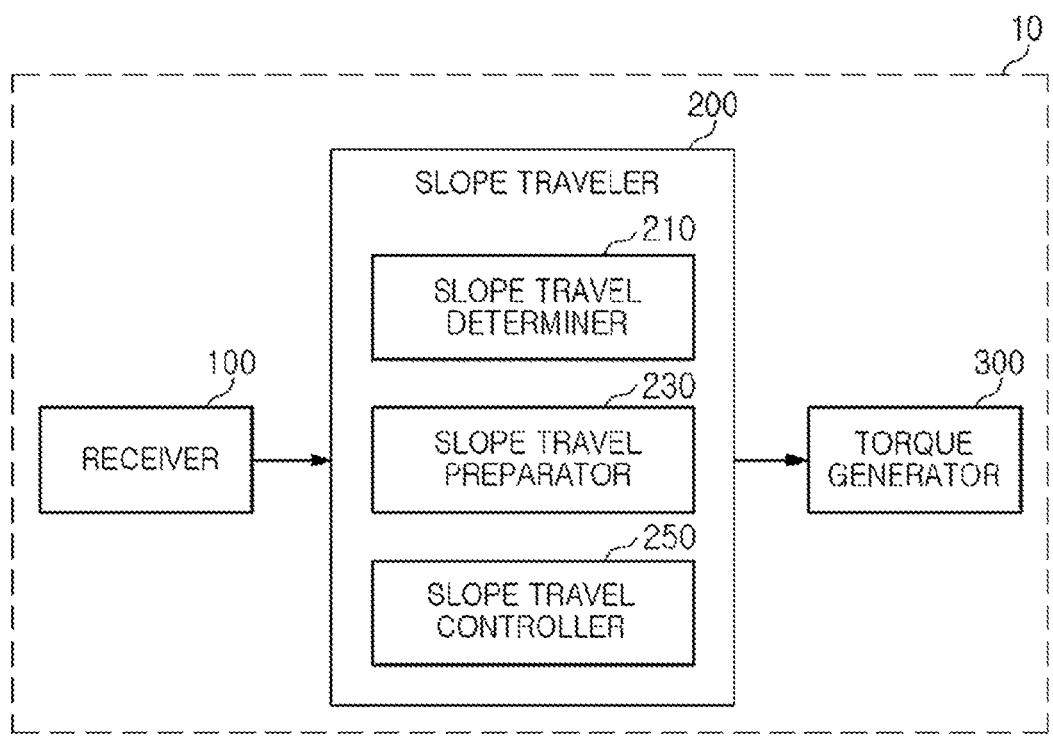
FIG. 2 is a block diagram illustrating a slope travel control apparatus according to an exemplary embodiment of the present disclosure.

FIG. 2 is a block diagram illustrating the slope travel control apparatus 10 according to an exemplary embodiment of the present disclosure.

The slope travel control apparatus 10 may include a receiver 100, a slope traveler 200, and torque generator 300.

The receiver 100 may receive various types of information necessary for controlling travel on a slope from various sensors mounted on a vehicle. For example, the receiver 100 may receive information on an angle of the travelling vehicle from a gradient sensor included in the vehicle to determine whether the vehicle is traveling on the slope. Furthermore, the receiver 100 may receive rotation speed data of each wheel of the vehicle, check data on adjustment of an accelerator pedal by a user, and receive output revolutions per minute (rpm) data of a motor or engine.

The receiver 100 may receive data from a wheel speed sensor, a longitudinal acceleration sensor, a gradient sensor, an accelerator position sensor (APS), and an output data motor of a motor or an engine or an output of revolutions per minute (RPM) sensor of the motor of the vehicle, and may transmit the received information to the slope traveler 200. Furthermore, the receiver 100 may receive output data of the motor or engine (for example, RPM, torque, torque rate, and the like of the motor or engine). The receiver 100 may be connected to the wheel speed sensor, the longitudinal acceleration sensor, the gradient sensor, the APS, and the RPM sensor of the motor or engine of the vehicle in a wired or wireless manner to exchange data. For example, data may be exchanged using communication means such as Ethernet, media oriented systems transport (MOST), Flexray, controller area network (CAN), local interconnect network (LIN), Internet, LTE, 5G, Wi-Fi, Bluetooth®, near field communication (NFC), Zigbee®, and radio frequency (RF).

The torque generator 300 may be an apparatus of generating torque including a magnitude transmitted through the slope traveler 200. The torque generator 300 may generate torque using an engine in the case of a vehicle using an internal combustion engine, may generate torque using a motor in the case of an electric vehicle, and may generate torque using the engine or motor in the case of a hybrid vehicle.

Referring back to FIG. 1, the slope traveler 200 may further include a slope travel determiner 210, a slope travel preparator 230, and a slope travel controller 250.

The slope travel determiner 210 may determine whether to start slope travel control based on whether the vehicle is traveling on the slope, whether wheel slip of the vehicle occurs, or the like. Slope travel control may be started automatically according to the determination of the slope travel determiner 210 or may be started manually according to operation of the user. For example, a button for selecting slope travel control may be provided on a dashboard of the vehicle, and the user such as a driver may select the button to start slope travel control. Furthermore, slope travel control may be selected and inputted using a display screen including an interface, and a structure or method therefor is not limited as long as the user is able to set slope travel control.

The slope travel preparator 230 may prepare for slope travel control based on the determination of the slope travel determiner 210 or a user input. First, the slope travel preparator 230 may start an APS mode to generate driving torque under control of the slope traveler 200 regardless of a size of the accelerator pedal by the user. Here, the virtual APS mode may be a mode in which the driving torque is adjustable through the slope traveler 200 regardless of a magnitude of adjustment of the size of the accelerator pedal by the user. In general, the vehicle may generate the driving torque in proportion to a degree of adjustment of the accelerator pedal by the user. However, in the virtual APS mode, the vehicle may travel using the driving torque determined through the slope traveler 200 regardless of the degree of adjustment of the accelerator pedal by the user. Furthermore, in the virtual APS mode, the driving torque may not be controlled according to the degree of adjustment of the accelerator pedal, but only a driving intention of the user may be confirmed by checking whether the user operates the accelerator pedal. For example, when the user does not step on the accelerator pedal, it may be considered that the user shows an intention to stop the vehicle, and hill hold torque, driving torque for stopping the vehicle on the slope, may be generated. Furthermore, when the user operates the accelerator pedal, it may be considered that the user shows an intention to drive the vehicle, and the vehicle may travel on the slope by generating a target torque regardless of the degree of adjustment of the accelerator pedal.

The slope travel preparator 230 may determine the hill hold torque and the target torque.

The hill hold torque may be obtained by calculation. Referring to FIG. 1, for example, when a resultant force of a force (mgsinθ) generated by a weight on the slope and a friction force (μmgcosθ) is equal to a force caused by driving torque (Tw) generated by the torque generator 300 and a dynamic radius (R) of the tire, the hill hold torque may be calculated. FIG. 1 schematically illustrates force acting the vehicle, and a more accurate value may be calculated using a more detailed equilibrium expression in consideration of inertial force and the like. Furthermore, a frictional force in a stationary state may increase to a maximum static frictional force in proportion to external force so that the hill hold torque may have a value between the force (Mgsinθ) generated by the weight on the slope and a resultant force of the force (Mgsinθ) generated by the weight on the slope and the maximum static friction force.

The target torque may be torque configured for starting the vehicle on the slope. The target torque may be calculated by an expression in a same manner as the hill hold torque, or may be determined based on travel data when entering the slope for the first time.

Furthermore, the target torque may be a value in accordance with a specification of the vehicle such as a vehicle weight or a tire dynamic radius, and a gradient of the slope. Depending on the type of vehicle, a table derived through an experiment may be prepared, and the target torque may be determined using the table. Furthermore, travel data of the vehicle may be stored and recorded, and the target torque may be determined using the accumulated travel data.

The slope traveler 200 may control the torque generator 300 to control the driving torque. The slope traveler 200 may determine hill hold torque or an inclination reaching a target torque from the hill hold torque, and control the torque generator 300 to generate torque corresponding to the determined inclination.

Furthermore, the slope travel controller 250 may monitor a degree of wheel slip occurring in the vehicle. As the vehicle travels on the slope, a road surface friction coefficient of the slope may change and the gradient of the slope may also change so that excessive degree of wheel slip may occur during travel even when slope travel control is performed with an initially set hill hold torque and target torque. Here, the excessive degree of wheel slip may refer to wheel slip including a preset value or more. For example, in the case of a vehicle on a slope, a difference in axle weight between front and rear wheels may occur. A wheel with a low axle weight may have a decreasing frictional force, resulting in wheel slip. A wheel with a high axle weight may have increasing frictional force so that a gripping force of a tire may be maintained, facilitating the vehicle to travel. Furthermore, even when a wheel slip temporarily occurs, the gripping force of the tire may be immediately restored, and the vehicle may travel. Accordingly, a degree of wheel slip occurring or a maintenance time value for the occurrence of wheel slip may be preset. When the preset wheel slip value or more occurs, it may be determined that an excessive degree of wheel slip occurs.

When the excessive degree of wheel slip occurs, it may be necessary to reset the initially set hill hold torque and target torque. The slope travel controller 250 may re-determine the hill hold torque and the target torque according to a state of the slope, or request the slope travel preparator 230 to re-determine the hill hold torque and the target torque. Here, to distinguish, from each other, hill hold torques and target torques before and after the occurrence of the excessive degree of wheel slip, hill hold torque and a target torque before the occurrence of the excessive degree of wheel slip may be referred to as a first hill hold torque and a first target torque, and a reset hill hold torque and target torque after the occurrence of the excessive degree of wheel slip may be referred to as a second hill hold torque and a second target torque.

Furthermore, when a wheel slip including a preset value or more than the preset value occurs, the slope travel controller 250 may adjust an inclination reaching the target torque from the re-determined hill hold torque, reducing the occurrence of wheel slip due to rapid torque change. A torque increase inclination before the occurrence of an excessive degree of wheel slip may be referred to as a first inclination. A torque increase inclination after the occurrence of the excessive degree of wheel slip may be referred to as a second inclination. The second inclination may be equal to or less than the first inclination. The second inclination may be allowed to be equal to or less than the first inclination, reducing the influence of the wheel slip caused by the torque change.

The slope travel determiner 210, the slope travel preparator 230, and the slope travel controller 250 may be implemented through a processor configured to perform operations described below using non-volatile memory configured to store data on an algorithm configured to control operations of various components of a vehicle or software instructions for reproducing the algorithm, and the data stored in the memory. Here, the memory and the processor may be implemented as separate chips. Alternatively, the memory and processor may be implemented as a single chip integrated with each other. The processor may be in a form of one or more processors.

Figure 3:
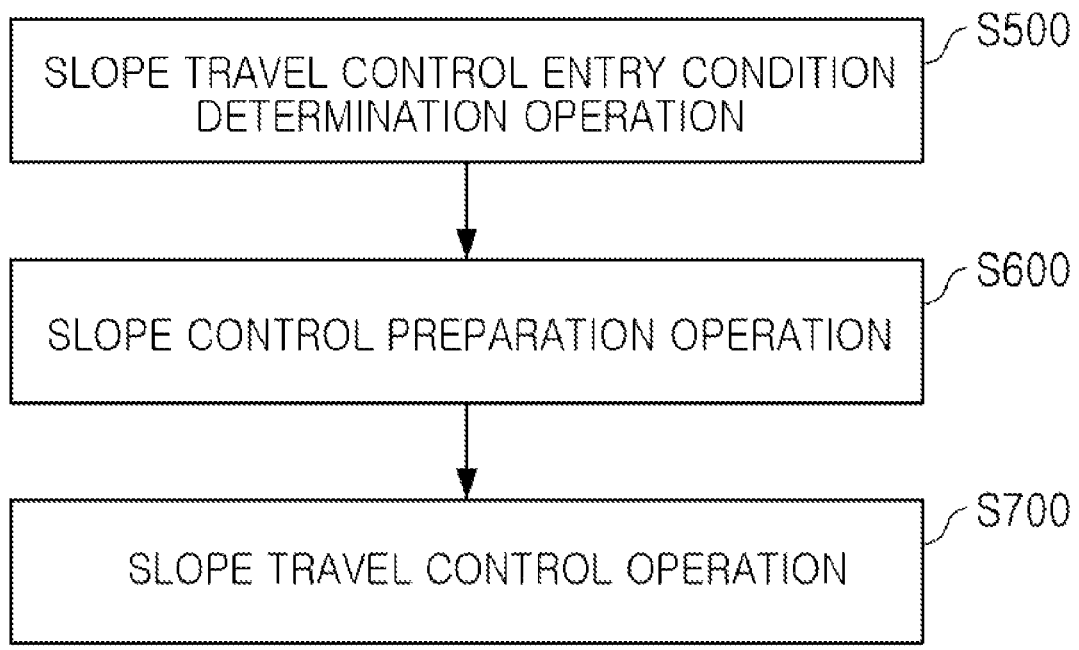
FIG. 3 is a block diagram illustrating respective operations of a slope travel control method according to an exemplary embodiment of the present disclosure.

FIG. 3 is a block diagram illustrating respective operations of a slope travel control method according to an exemplary embodiment of the present disclosure.

The slope travel control method may include a slope travel control entry condition determination operation (S500) of determining whether to start slope travel control, a slope control preparation operation (S600) of changing vehicle settings for slope travel control, and a slope travel control operation (S700) of controlling a driving torque of the vehicle so that the vehicle travels or stops on a slope using slope travel control.

In the slope travel control entry condition determination operation (S500), slope travel control may be started by checking whether the vehicle is traveling on a slope with low friction. In other words, in the slope travel control entry condition determination operation (S500), it may be determined whether wheel slip occurs in the vehicle traveling on the slope to determine whether the vehicle enters slope travel control.

A slope travel control entry condition may be determined based on whether the vehicle is traveling on the slope and whether wheel slip occurs. Whether the vehicle is traveling on the slope may be determined by receiving a gradient of a road on which the vehicle is traveling using a gradient sensor. Furthermore, a difference between an actual longitudinal acceleration measured using a longitudinal acceleration sensor mounted on the vehicle and a longitudinal acceleration expected through output of the vehicle may be used to determine that the vehicle is travelling on the slope. Unlike a flat ground, when the vehicle travels on the slope, the actual acceleration may be measured to be less than the acceleration expected through the vehicle output depending on a gradient load so that the gradient of the slope may be checked using the difference between the expected acceleration and the actual acceleration.

As a method of determining a degree of wheel slip occurring, speeds of front, rear, left and right wheels of the vehicle may be compared to determine the degree of wheel slip. When the vehicle is started in a stationery state, a difference between the speeds of the front, rear, left and right wheels of the vehicle may be checked. When there are one or more wheels with a large difference in wheel speed, it may be determined that wheel slip occurs in a wheel with high wheel speed, and the vehicle is traveling on a road with a low friction coefficient.

When a wheel slip occurs in all wheels of the vehicle, the respective wheel speeds may be similar, it may not be determined, based on a wheel speed difference solely, whether wheel slip occurs and that the vehicle is traveling on a road with low friction. When a wheel slip occurs in all wheels of the vehicle, it may be difficult to start the vehicle so that a longitudinal acceleration of the vehicle may occur to be relatively lower than a longitudinal acceleration corresponding to a wheel speed. Accordingly, an expected final acceleration corresponding to a degree of adjustment (APS) of an accelerator pedal by a user and corresponding to a gear stage may be compared to an actual final acceleration. When there is a large difference therebetween, it may be determined that wheel slip occurs in the vehicle, and the vehicle is travelling on a road with a low friction coefficient. Here, when the vehicle is started on a slope, a change amount in the longitudinal acceleration according to a gradient of the slope may be present. Accordingly, a comparison may be performed by excluding the change amount in the longitudinal acceleration according to the vehicle started on the slope.

When the vehicle is started on a slope, a gradient load may be acting on lower an RPM. Accordingly, the RPM may rise to be less than an RPM corresponding to an APS input by the user. Here, when a wheel slip of the vehicle occurs, the RPM may rise without being lowered so that it may be determined that the vehicle is travelling on a slope with a low friction coefficient by checking trend of the RPM to determine whether wheel slip is occurring in the vehicle.

Determination of a slope travel control entry condition may be performed by first determining that the vehicle is traveling on a slope, and then determining a degree of friction on the slope. On the slope, a difference in axle weight of front and rear wheels may occur. Even on a road with a high friction coefficient, wheel slip may occur in a wheel including a relatively low axle weight when the vehicle is initially started. However, in the instant case, driving force of the wheel with a relatively high axle weight may be maintained, the wheel slip may be resolved within a short time period, and a difference between an expected final acceleration and an actual final acceleration of the vehicle may be eliminated so that there is no need to control travel on the slope. Accordingly, in determining the slope travel control entry condition, it may be preferable to first determine a gradient and determine a degree of friction on the slope according to whether wheel slip of the vehicle occurs, but the present disclosure is not limited thereto. Furthermore, a state of a road may be directly input through a device (for example, auto terrain) configured for detecting the state of the road on which the vehicle is traveling.

When it is determined that slope travel control is necessary in the slope travel control entry condition determination operation (S500), the slope travel control preparation operation (S600) may be performed. The slope control preparation operation (S600) may further include a virtual APS control operation and hill hold torque determination operation.

The virtual APS control operation may be an operation in which driving torque is adjustable regardless of a degree of adjustment of an accelerator pedal in the vehicle by a user. In general, the driving torque of the vehicle may be generated in proportion to the degree of adjustment of the accelerator pedal by the user, but in the virtual APS control operation, only whether the accelerator pedal is adjusted may be determined. In other words, based on whether the accelerator pedal is operated regardless of a degree of the accelerator pedal being adjusted by the user, driving torque equal to hill hold torque may be generated to stop the vehicle on a slope when accelerator pedal is not operated, and driving torque greater than the hill hold torque may be generated to allow the vehicle to travel when the accelerator pedal is operated.

The hill hold torque determination operation may be an operation of determining hill hold torque, driving torque configured for maintaining the vehicle in a stationary state on a slope. The hill hold torque may be torque allowing the vehicle to be stopped on the slope by balancing a force caused by a weight of the vehicle on the slope and the driving torque of the vehicle. Here, the hill hold torque of the vehicle may be a value between a value obtained by dividing the force caused by the weight of the vehicle by a dynamic radius of a tire and a value obtained by dividing a resultant force of the force caused by the weight of the vehicle and a maximum static frictional force acting through the tire by the dynamic radius of the tire. Furthermore, the hill hold torque may be set by preparing in advance a table corresponding to one or more values of a gradient of the slope, a friction coefficient of the slope, and torque for generating wheel slip, based on repeated travel tests of the vehicle, and using the table. Furthermore, the stored hill hold torque value may be optimized by comparing a value of the table provided in advance to a value obtained by storing continuously or periodically of actual travel data.

Figure 4:
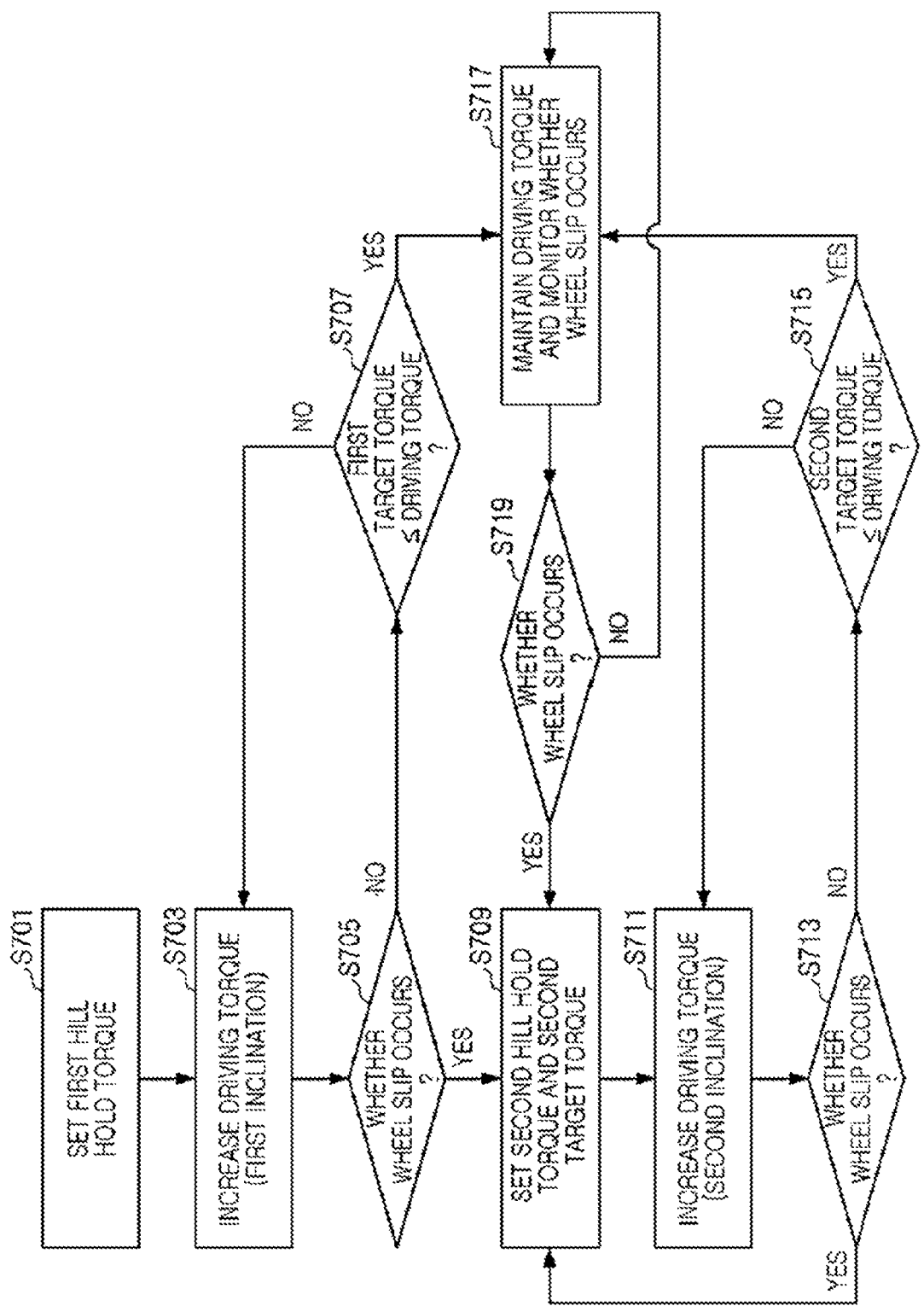
FIG. 4 is a block diagram illustrating detailed operations of a slope travel control operation in FIG. 3.

FIG. 4 is a block diagram illustrating detailed operations of a slope travel control operation (S700) in FIG. 3.

When the slope travel control preparation operation (S600) is completed, the slope travel control operation (S700) may be performed. The slope travel control operation (S700) may generate hill hold torque to stop the vehicle on the slope (S701). Here, the slope travel control operation (S700) may be in a virtual APS control state so that driving torque may be adjusted by the slope travel controller 250 regardless of a degree to which a user adjusts an accelerator pedal, and a driving intention of the user may be confirmed by checking whether the user operates the accelerator pedal.

Thereafter, when the user shows the driving intention by operating the accelerator pedal, the user may drive the vehicle while increasing the driving torque from the hill hold torque to a target torque at a preset first inclination (S703). Here, the target torque may refer to torque required to start a vehicle which is stopped by generating the hill hold torque on the slope. The target torque may be a value determined or preset according to specifications such as a vehicle weight and a tire dynamic radius, and a gradient and a friction coefficient of the slope. Unlike a method according to the related art, the driving torque may be increased from the hill hold torque to the target torque, more gradually increasing the driving torque as compared to the method according to the related art, and reducing the occurrence of wheel slip caused by a rapid torque change.

Thereafter, it may be checked whether an excessive degree of wheel slip occurs in a process of increasing the driving torque to the target torque (S705). Even when the vehicle travels while maintaining the target torque, wheel slip may occur according to the gradient or friction coefficient of the slope changing while travelling. Here, the excessive degree of wheel slip may refer to wheel slip including a preset value or more. For example, in the case of a vehicle on a slope, a difference in axle weight between front and rear wheels may occur. A wheel with a low axle weight may have a decreasing frictional force, resulting in wheel slip. A wheel with a high axle weight may have increasing frictional force so that a gripping force of a tire may be maintained, facilitating the vehicle to travel. Furthermore, even when a wheel slip temporarily occurs, the gripping force of the tire may be immediately restored, and the vehicle may travel. Accordingly, a degree of wheel slip occurring or a maintenance time value for the occurrence of wheel slip may be preset. When the preset wheel slip value or more occurs, it may be determined that an excessive degree of wheel slip occurs.

When the wheel slip including a preset value or more than the preset value does not occur, the driving torque may be increased to a first target torque (S707). When the wheel slip including a preset value or more than the preset value occurs, the hill hold torque and the target torque of the vehicle may be reset (S709).

Here, to distinguish, from each other, hill hold torques and target torques before and after the occurrence of the excessive degree of wheel slip, hill hold torque and a target torque before the occurrence of the excessive degree of wheel slip may be referred to as first hill hold torque and a first target torque, and a reset hill hold torque and target torque after the occurrence of the excessive degree of wheel slip may be referred to as a second hill hold torque and a second target torque. The second hill hold torque and the second target torque may be equal to or less than the first hill hold torque and the first target torque.

When the hill hold torque of the vehicle is reset, the vehicle may travel while increasing the driving torque to the second target torque to have a second inclination from the second hill hold torque (S711). Here, the second inclination may be equal to or less than the first inclination. The torque may be increased at the second inclination equal to or less than the first inclination, minimizing the occurrence of wheel slip caused by the rapid torque change. Furthermore, it may be checked continuously or periodically whether wheel slip occurs in a process of increasing the driving torque to the second target torque (S713). When a wheel slip occurs again, a process of resetting the hill hold torque, adjusting an inclination at which the torque increases, and increasing the driving torque may be repeatedly performed (S709 and S715).

Furthermore, when a wheel slip including preset value or more occurs, the driving torque may be switched to the reset second hill hold torque for a predetermined time period (for example, 2 to 4 seconds) to check whether the vehicle is stabilized, and then the driving torque may be increased to the target torque.

Finally, when the driving torque reaches the target torque (S707 and S715), the driving torque may be maintained, and the vehicle may travel while continuously or periodically checking whether wheel slip occurs (S717 and S719). Here, when a wheel slip occurs again, the operations S709 to S715 may be repeatedly performed.

In setting hill hold torque or target torque for a four-wheel drive vehicle, when climbing a slope, a larger amount of hill hold torque or target torque may be distributed to rear wheels than to front wheels so that driving torque of the rear wheels may be relatively higher than driving torque of the front wheels. Conversely, when descending on the slope, a larger amount of hill hold torque or target torque may be distributed to the front wheels than to the rear wheels so that the driving torque of the front wheels may be relatively higher than the driving torque of the rear wheels. A frictional force between the slope and a tire may be proportional to a weight acting thereon so that driving torque of an axle to which a relatively higher weight is applied may be generated, facilitating the vehicle to more stably travel.

The methods according to the above-described example embodiments may be recorded in non-transitory computer-readable media including program instructions to implement various operations of the above-described example embodiments. The media may also include, alone or in combination with the program instructions, data files, data structures, and the like. The program instructions recorded on the media may be those specially designed and constructed for the purposes of example embodiments, or they may be of the kind well-known and available to those including skill in the computer software arts.

Examples of non-transitory computer-readable media include hardware devices that are specially configured to store and perform program instructions, such as read-only memory (ROM), random access memory (RAM), flash memory, and the like. Examples of program instructions include both machine code, such as produced by a compiler, and higher-level code which may be executed by the computer using an interpreter. The above-described devices may be configured to act as one or more software modules to perform the operations of the above-described example embodiments, or vice versa.

In various exemplary embodiments of the present disclosure, the scope of the present disclosure includes software or machine-executable commands (e.g., an operating system, an application, firmware, a program, etc.) for facilitating operations according to the methods of various embodiments to be executed on an apparatus or a computer, a non-transitory computer-readable medium including such software or commands stored thereon and executable on the apparatus or the computer.

In various exemplary embodiments of the present disclosure, the control device may be implemented in a form of hardware or software, or may be implemented in a combination of hardware and software.

Furthermore, the terms such as "unit", "module", etc. included in the specification mean units for processing at least one function or operation, which may be implemented by hardware, software, or a combination thereof.

For convenience in explanation and accurate definition in the appended claims, the terms "upper", "lower", "inner", "outer", "up", "down", "upwards", "downwards", "front", "rear", "back", "inside", "outside", "inwardly", "outwardly", "interior", "exterior", "internal", "external", "forwards", and "backwards" are used to describe features of the exemplary embodiments with reference to the positions of such features as displayed in the figures. It will be further understood that the term "connect" or its derivatives refer both to direct and indirect connection.

The foregoing descriptions of specific exemplary embodiments of the present disclosure have been presented for purposes of illustration and description. They are not intended to be exhaustive or to limit the present disclosure to the precise forms disclosed, and obviously many modifications and variations are possible in light of the above teachings. The exemplary embodiments were chosen and described in order to explain certain principles of the invention and their practical application, to enable others skilled in the art to make and utilize various exemplary embodiments of the present disclosure, as well as various alternatives and modifications thereof. It is intended that the scope of the present disclosure be defined by the Claims appended hereto and their equivalents.

What is claimed is:

1. An apparatus of controlling travel on a slope, the apparatus comprising:
   a receiver configured for obtaining information on a vehicle;
   a first controller configured to determine whether the vehicle is traveling on a slope requiring a slope travel control;
   a second controller configured to set a virtual accelerator position sensor (APS) mode, and determine hill hold torque based on the obtained information on the vehicle;
   a third controller operatively connected to the first controller and the second controller and configured to determine driving torque of the vehicle, and control the vehicle to stop or travel on the slope by generating driving torque without braking torque in an amount equal to or greater than the determined hill hold torque, wherein the third controller adjust an incline of increasing the driving torque from the hill hold torque to a target torque; and
   a driving unit operatively connected to the third controller and configured to generate the driving torque determined by the third controller.

2. The apparatus of claim 1, wherein the virtual APS mode is a mode in which the driving torque is controlled by the third controller regardless of a degree of adjustment of an accelerator pedal in the vehicle by a user.

3. The apparatus of claim 1, wherein the hill hold torque is a torque for stopping the vehicle on the slope by allowing the driving unit to generate the driving torque without operating a brake of the vehicle on the slope.

4. The apparatus of claim 1, wherein the first controller is configured to determine, based on whether the vehicle enters the slope and a degree of wheel slip occurring in the vehicle, whether the vehicle is traveling on the slope requiring the slope travel control.

5. The apparatus of claim 4, wherein the receiver is configured to receive at least one of wheel speed data, longitudinal acceleration data, gradient data, and output data of a motor or an engine of the vehicle, as the information on the vehicle.

6. The apparatus of claim 1, wherein the third controller is configured to reset the hill hold torque and adjust a rising inclination of the driving torque, when a wheel slip including a preset value or more than the preset value occurs in the vehicle while travelling on the slope.

7. The apparatus of claim 1, wherein the target torque is a torque for starting to travel the vehicle on the slope by allowing the driving unit to generate the driving torque without operating a brake of the vehicle on the slop.

8. A method for controlling travel on a slope, the method comprising:
   setting a virtual accelerator position sensor (APS) mode, and preparing, based on information on a vehicle, a slope travel control for determining hill hold torque; and
   controlling, by a third controller, driving torque of the vehicle so that the vehicle stops or travels on the slope by generating the driving torque without braking torque in an amount equal to or greater than the hill hold torque,
   wherein the third controller adjust a incline of increasing the driving torque from the hill hold torque to a target torque.

9. The method of claim 8, further including determining a condition for starting the slope travel control.

10. The method of claim 9, wherein the determining a condition for starting the slope travel control includes:
    determining, based on whether the vehicle enters the slope and a degree of wheel slip occurring in the vehicle, whether to perform an operation of preparing the slope travel control.

11. The method of claim 10, wherein the determining a condition for starting the slope travel control further includes:
performing the determining whether to perform an operation of preparing the slope travel control, using at least one of wheel speed data, longitudinal acceleration data, gradient data, and output data of a motor or an engine of the vehicle, as the information on the vehicle.

12. The method of claim 8, wherein the virtual APS mode is a mode in which the driving torque is controlled by the third controller regardless of a degree of adjustment of an accelerator pedal in the vehicle by a user.

13. The method of claim 8, wherein the hill hold torque is a torque for stopping the vehicle on the slope by allowing a driving unit operatively connected to the third controller to generate the driving torque without operating a brake of the vehicle on the slope.

14. A non-transitory computer readable storage medium on which a program for performing the method of claim 8 is recorded.

15. A slope travel control method for controlling a driving torque of a vehicle without braking torque so that the vehicle stops or travels on a slope in a virtual accelerator position sensor (APS) mode in which the driving torque is controlled by a third controller performing a slope travel control for determining a hill hold torque regardless of a degree of adjustment of an accelerator pedal in the vehicle by a user, the slope travel control method comprising:
increasing the driving torque from a first hill hold torque of the hill hold torque to a first target torque at a first inclination;
resetting the first hill hold torque, the first inclination, and the first target torque to a second hill hold torque of the hill hold torque, a second inclination and a second target torque, respectively, when a wheel slip including a preset value or more than the preset value occurs in the vehicle;
increasing the driving torque from the second hill hold torque to the second target torque at the second inclination; and
repeatedly performing the increasing the driving torque,
wherein the hill hold torque is a torque for stopping the vehicle on the slope by allowing a driving unit operatively connected to the third controller to generate the driving torque without operating a brake of the vehicle on the slope, and
wherein the first inclination and the second inclination are different.

16. The slope travel method of claim 15, wherein the second inclination is equal to or less than the first inclination.

17. The slope travel method of claim 15, further including preparing the slope travel control in a four-wheel-drive vehicle.

18. The slope travel method of claim 17, wherein the preparing the slope travel control in a four-wheel-drive vehicle includes setting hill hold torques and driving torques of front wheels and rear wheels of the vehicle differently in accordance with a direction of travel on the slope.

19. The slope travel method of claim 15, wherein the virtual APS mode is a mode in which the driving torque is controlled by the third controller regardless of the degree of adjustment of the accelerator pedal by the user.

20. A non-transitory computer readable storage medium on which a program for performing the method of claim 15 is recorded.

* * * * *